United States Patent [19]

Kass et al.

[11] Patent Number: 5,649,891
[45] Date of Patent: Jul. 22, 1997

[54] COMPOSITE GUDGEONS AND ROLLER ASSEMBLIES

[75] Inventors: Allen Kass, Pittsford; Robert A. Lancaster, Hilton, both of N.Y.

[73] Assignee: Eastman Kodak Company, Rochester, N.Y.

[21] Appl. No.: 572,198

[22] Filed: Dec. 13, 1995

[51] Int. Cl.⁶ .................................................. F16C 13/00
[52] U.S. Cl. .............................. 492/47; 492/46; 432/246
[58] Field of Search .................... 432/60, 236, 246; 138/89, 96 R, 109; 285/174, 238; 219/469, 470, 471; 198/790, 791; 492/46, 47, 53

[56] References Cited

U.S. PATENT DOCUMENTS

| | | |
|---|---|---|
| 4,229,950 | 10/1980 | Fessenden . |
| 4,322,158 | 3/1982 | Frias et al. . |
| 4,406,558 | 9/1983 | Kochendorfer et al. ................ 403/151 |
| 4,793,459 | 12/1988 | Forknall et al. . |
| 4,864,704 | 9/1989 | Hogan et al. . |
| 5,012,072 | 4/1991 | Martin et al. . |
| 5,094,613 | 3/1992 | Dolcimascolo et al. . |
| 5,221,947 | 6/1993 | Ndebi et al. . |

FOREIGN PATENT DOCUMENTS

| | | |
|---|---|---|
| 3436483 | 3/1984 | Germany . |
| 2165621 | 4/1986 | United Kingdom .................... 492/47 |
| 2181816 | 4/1987 | United Kingdom .................... 492/46 |

OTHER PUBLICATIONS

Research Disclosure, Heat Fixing Roller Powder Metal Gudgeon and Process for Making Same, Jan. 1991, pp. 41–42.

Research Disclosure, Crystalline Glass Ceramic for Magnetic Tape Heads, Dec. 1991, p. 970.

*Primary Examiner*—Henry A. Bennett
*Assistant Examiner*—Gregory Wilson
*Attorney, Agent, or Firm*—Anne B. Kiernan

[57] ABSTRACT

A composite gudgeon or endcap for a heated roller is provided which comprises a metal portion and a polymer portion. The gudgeon substantially reduces heat loss through the end of the roller and is of sufficient strength to support and transmit rotation to the roller.

21 Claims, 3 Drawing Sheets

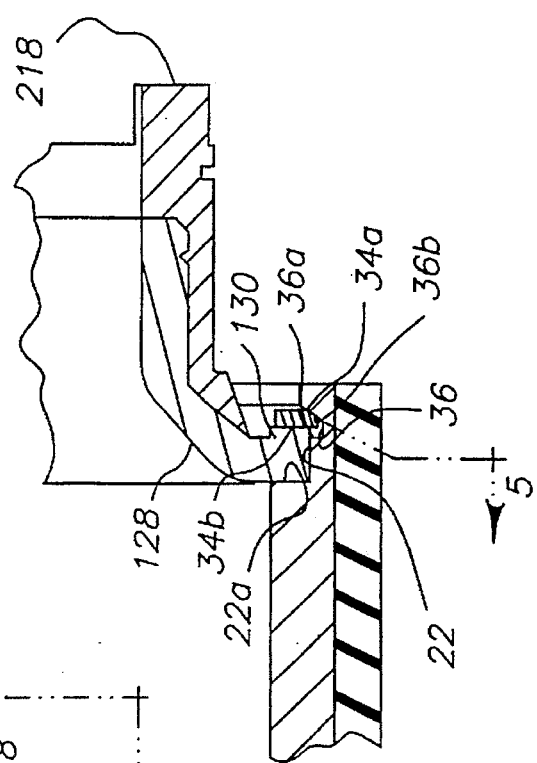
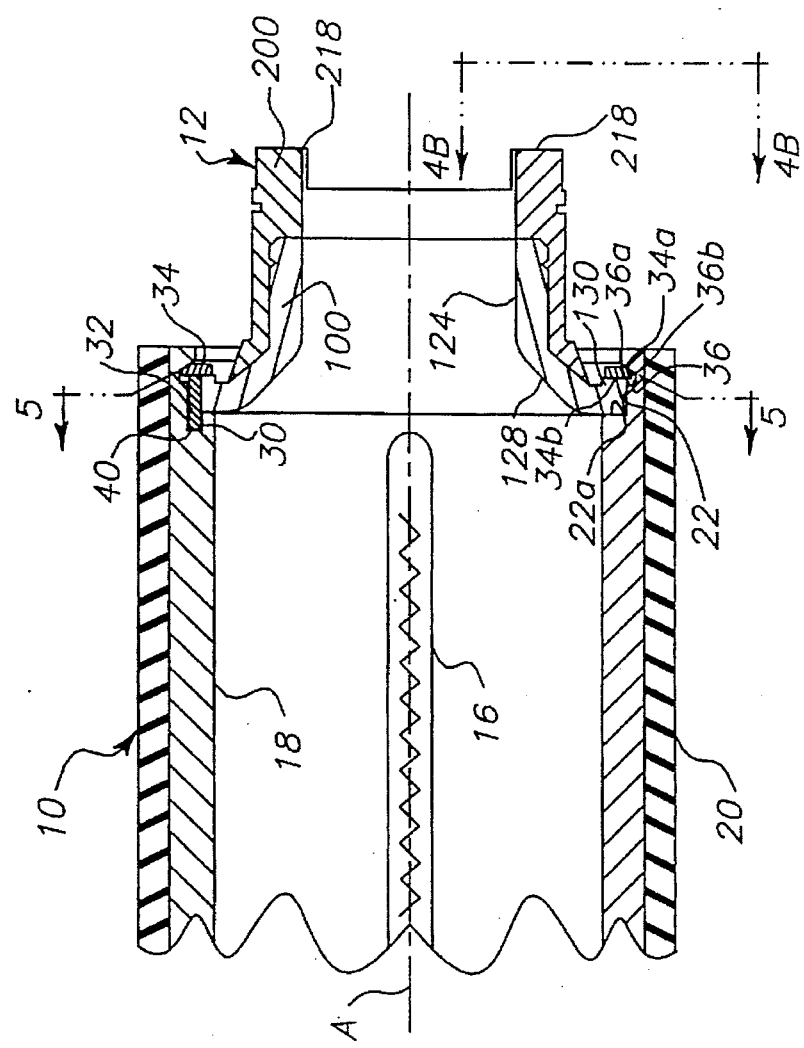

COMPOSITE GUDGEONS AND ROLLER ASSEMBLIES

FIELD OF THE INVENTION

This invention relates generally to heated rollers, and more particularly to gudgeons in driving or supporting engagement with heated rollers.

BACKGROUND OF THE INVENTION

In the printing and paper making industries, heated rollers are commonly used to feed paper sheets and simultaneously perform some processing step on the paper. For example, an internally or externally heated roller may serve as a fuser roller for electrostatographical machines, or as a calendar in making paper. In such applications, the roller is supported by gudgeons, also referred to as endcaps, inserted into bearings, and the roller is typically rotated by a drive source connected to at least one of the gudgeons. Heat through the surface of the roller accomplishes the desired fixing of toner images to the paper or calendaring of the paper. For fusing of toner images, the heated roller must be repeatedly heated and maintained at a high and precise fusing temperature typically in the range of about 149° to 205° C. (300° to 400° F.). Fusing of toner typically occurs under high pressures; therefore, the supporting end caps or gudgeons must be able to repeatedly withstand substantial forces at high temperatures in order to properly fuse the toner to the paper.

For precisely controlling the fusing temperature, heat loss (from the roller through the gudgeons to the surrounding environment) must be effectively minimized. In addition, decreasing heat loss through the gudgeons will minimize bearing grease degradation and thereby extend the life of the bearing. In order to decrease heat loss through the ends of the roller to the surrounding environment, the gudgeons attached to the roller are commonly constructed of a material having a relatively low thermal conductivity, e.g. plastic. However, such materials generally do not match the physical characteristics of the roller, e.g. metal, in for example, strength, and stiffness at fusing temperature. Thus, it is difficult to maintain the drive connection between the internally heated roller and the gudgeons. Further, some useful plastic materials which provide satisfactory performance as gudgeons are so costly that they are not practical to use.

Gudgeons have been constructed out of metal; however, the thermal conductivities of metals are very high resulting in very high heat loss to the environment, such as, the other parts of the electostatographic machine, for examples, the bearings, and photoconductive element.

In U.S. Pat. No. 5,094,613, powder metal materials have been disclosed for the construction of gudgeons, because of their low thermal conductivities relative to other metals; however, the thermal conductivity even of a powder metal stainless steel gudgeon allows for substantial heat loss through the gudgeons.

Further, it is known in the art to use a separate polymeric sleeve between a metal gudgeon and a bearing. The polymeric sleeve expands at the operation temperatures of the roller which results in a press-fit between the bearing and the gudgeon. However, the use of the metal gudgeon with the polymeric sleeve provides for high heat loss from the roller to the environment.

Therefore, there is a present need for an improved gudgeon which prevents substantial heat loss from a heated roller and has physical characteristics, e.g. strength and stiffness, which substantially match those of a metal core of a heated roller.

SUMMARY OF THE INVENTION

In accordance with the present invention, a gudgeon is provided for supporting and/or driving a heated roller having a mounting mechanism. The gudgeon comprises a metal portion and a polymer portion; said metal portion comprises a shoulder, a nose and first engagement features; said polymer portion comprises second engagement features, said first and second engagement features are complementary and attach said polymer portion to said metal portion at ambient temperature, and wherein when said gudgeon is in use said metal portion contacts said roller, and said polymer portion contacts said mounting mechanism for said roller; said nose having an interior surface area, and an exterior surface area; said polymer portion covering at least 60 percent of said exterior surface area of said nose to greatly reduce heat loss from said roller.

Further, a gudgeon for a heated roller is provided which comprises a metal portion and a polymer portion; said metal portion comprises first engagement features; said polymer portion comprises second engagement features, said first and second engagement features are complementary and attach said polymer portion to said metal portion at ambient temperature, and wherein when said gudgeon is in use said metal portion contacts said roller, and said polymer portion contacts said mounting mechanism for said roller; said polymer portion is 20 to 80 percent of the total volume of said gudgeon, and said metal portion is the remainder of the total volume of said gudgeon.

Additionally, a gudgeon is provided which comprises a head and a shaft; said shaft comprises a metal portion and a polymer portion; said metal portion of said shaft comprises first engagement features; said polymer portion of said shaft comprises second engagement features, said first and second engagement features are complementary and attach said polymer portion to said metal portion at ambient temperature, and wherein when said gudgeon is in use said metal portion contacts said roller, and said polymer portion contacts said mounting mechanism for said roller; said polymer portion of said shaft extends at least as far as said metal portion away from said head.

This invention provides a gudgeon having the necessary strength to support a heated roller and/or maintain driving engagement between a heated roller with a rotatively driven drive source. This invention also provides a gudgeon with lower thermal conductivities than an all-metal gudgeon, and all-metal gudgeons using a separate polymeric sleeve between the gudgeon and the bearing, thereby preventing the loss of heat from the heated roller through the gudgeon. Another advantage of this invention over an all-metal gudgeon having a sleeve is that the composite gudgeon can be in a roller core while a roller coating is put on the core and then machined, ground or otherwise finished. By machining the roller coating with the gudgeon in the roller, precise operating tolerances can be achieved which are difficult to achieve when using a separate polymeric sleeve between the gudgeon and the bearing.

BRIEF DESCRIPTION OF THE DRAWINGS

FIG. 4 is a side view, in cross-section of one end of a roller assembly of this invention having an internally heated roller coupled to the gudgeon of FIG. 1.

DETAILED DESCRIPTION OF THE INVENTION

The composite gudgeon of this invention is particularly suited for heated rollers, preferably fuser rollers useful in electrostatographic machines. A pair of composite gudgeons are fastened, welded, press-fit, shrink-fit or otherwise coupled to the ends of a roller. The composite gudgeon comprises a metal portion and a polymer portion. It is preferred that each portion constitute a single unit. Each portion can have a uniform composition throughout or can be a composite structure. For example, the metal portion can have a main structure of one metal or alloy covered by a plating of another material.

The volume of the polymer portion is preferably 20 to 80 percent of the total volume of the gudgeon, more preferably the volume of the polymer portion is 30 to 70 percent of the total volume of the gudgeon, most preferably the volume of the polymer portion is 40 to 60 percent of the total volume of the gudgeon. Preferably, the remainder of the volume of the gudgeon consists of the metal portion. It is preferred that greater than 30%, more preferred greater than 40%, most preferred greater than 45% of the surface area of the metal portion of the gudgeon is covered with the polymer portion. It is preferred that the metal portion contacts the core of the roller and that the polymer portion contacts the mounting mechanism which includes the support and/or the drive source for a roller, so that the polymer portion will contact the lower temperature metal portion of the gudgeon rather than the higher temperature core. It is preferred that the polymer portion and the metal portion of the gudgeon both share the torsional, compressional, shear, and tensile load of the roller from ambient to the operating temperatures of the gudgeon. For most uses ambient temperature will be room temperature about 20°–25° C. Further, for gudgeons connected to the drive source, it is preferred that the torque for rotating the roller is transmitted from the polymer portion to the metal portion of the gudgeon and thereby to the roller core.

Figure 1:
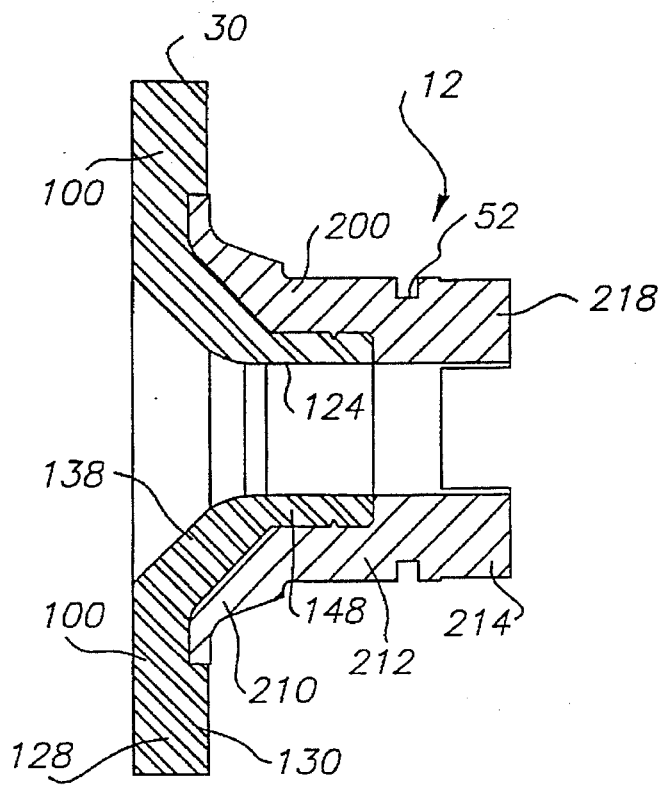
FIG. 1 is a side section view, in cross-section of an embodiment of the gudgeon of the present invention.
Figure 2:
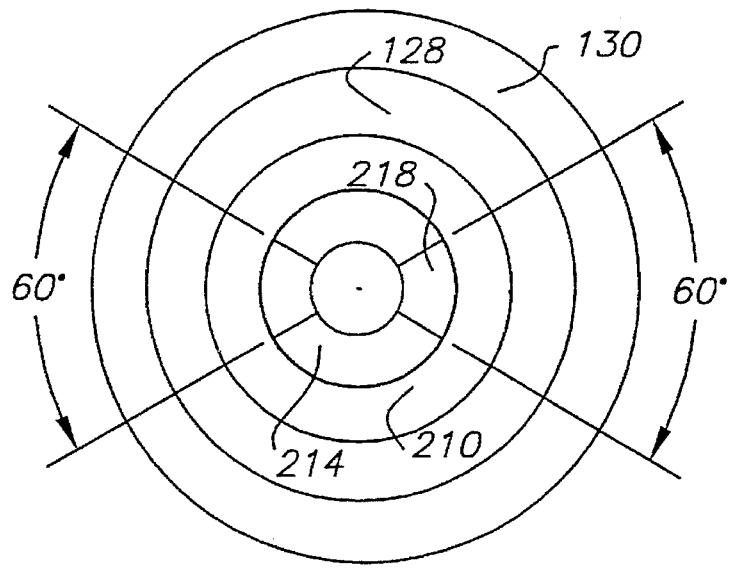
FIG. 2 is an end section view of the gudgeon of FIG. 1.

FIGS. 1, 2 and 4 show a composite gudgeon 12 of this invention having a metal portion 100 and a polymer portion 200. The composite gudgeon 12 has a generally cylindrical shape consisting of a head 60 and a shaft 70. The head 60 is the part of the gudgeon which when the gudgeon is coupled to a roller 10 defines a disk-shape disposed substantially perpendicular to the axis A of the roller 10. The head 60 includes the part of the gudgeon that is welded or inserted or otherwise attached to the core. Preferably at least 90% by volume, more preferably 100% by volume of the head 60 consists of the metal portion 100 of the gudgeon 12. The shaft 70 is the part of the gudgeon 12 which protrudes from the head 60 and extends substantially perpendicularly from the head 60 and contacts the mounting mechanism 300 for the roller 10. Preferably, the shaft 70 is formed by and consists of the polymer portion 200 and part of the metal portion 100. The shape of the shaft 70 is typically dictated by the mounting mechanism 300 for the roller 10, which preferably at a minimum consists of a bearing 302; therefore, at least a segment of the shaft 70 preferably has a cylindrical shape to fit into the bearing 302, although other shapes can be used and still fit into a bearing 302.

It is prefered that between 10% and 99% by volume, more preferably between 30% and 90% by volume, and most preferably between 40% and 90% by volume of the shaft consists of the polymer portion 200. Preferably the remainder of the volume of the shaft consists of parts of the metal portion 100.

Figure 3:
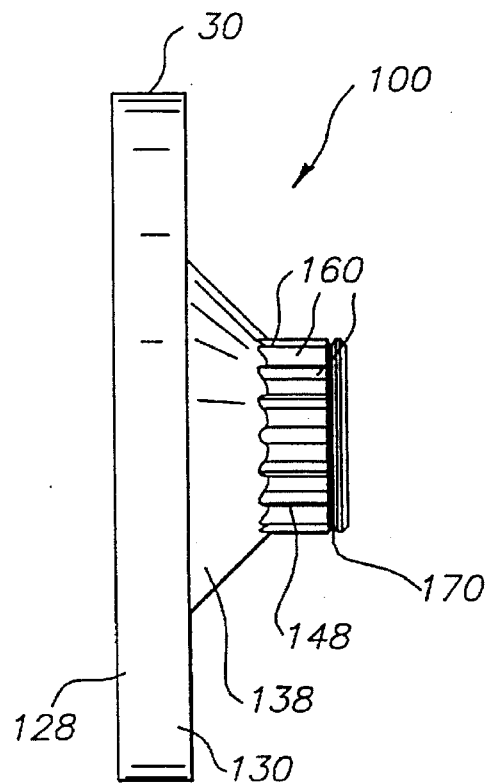
FIG. 3 is a side section view of the metal portion of the gudgeon of FIG. 1.

As shown in FIGS. 1 and 3, the metal portion 100 is preferably molded (and optionally machined if close tolerances are required) to have a generally cylindrical shape consisting of an annular shoulder 128, and a nose 148. The nose 148 is the part of the metal portion 100 that also comprises part of the shaft 70. The nose 148 can have any shape as long as the polymer portion 200 can be mechanically attached to it to form the shaft 70. The nose consists of an interior surface area 148a and an exterior surface area 148b. In use, the exterior surface area 148b of the nose 148 is closer to the mounting mechanism 300 (shown in FIG. 4) for the roller than the interior surface area 148a of the nose 148.

In the embodiment shown in FIGS. 1 and 2, the nose 148 consists of a mid-section 138 and a grooved section 150. The grooved section 150 preferably has diametrical dimensions less than that of the shoulder 128. The mid-section 138 preferably has a decreasing diameter from where it meets the shoulder 128 to where it meets the grooved section 150; however, in other embodiments the mid-section 138 can have the same diameter as the grooved section 150, or any other shape, or the grooved section 150 can be directly attached to the shoulder without the prescence of the mid-section 138. The grooved section 150 preferably has a generally constant diameter.

Located on at least a portion of the exterior surface area 148a of the nose 148 are first engagement features 120, such as, knurls 160 and undercuts 170 located around the diameter of the grooved section 150 and the mid-section 138. The preferred number of knurls around the diameter are between 2 and 32, more preferably about 16. The knurls 160 and the undercuts 170 are present to provide for the mechanical attachment of the polymer portion 200 to the metal portion 100. In addition to or in substitution for the knurls 160 and the undercuts 170, alternate first engagement features can be present in the grooved section 150, the shoulder 128, and/or the mid-section 138. It is preferred that first engagement features are present in the grooved section 150, and more preferably in the mid-section 138 and in the grooved section 150. Other types of first engagement features 120 include any protruding or intruding shapes that will help to hold the polymer portion 200 to the metal portion 100, for example, spiral cuts, lengthwise indentations, flats, 'D' shapes, and dovetails. It is preferred that first engagement features 120 having small radiuses and sharp corners are avoided to minimize stress on the polymer portion 200.

The shoulder 128 is the part of the head 60 consisting of the metal portion 100. In the preferred embodiment in which the polymer portion does not form any part of the head 60, the head 60 and the shoulder 128 are both the same part of the gudgeon 12. The shoulder 128 can have a ridge 130. The ridge 130 is useful for forming a seal with polymer molding equipment if the polymer portion 200 is molded to the metal portion 100. Preferably, there is an optional key-way 30 in the shoulder 128 of the metal portion 100. The key-way will be described in more detail with reference to FIG. 4.

The polymer portion 200 is preferably molded onto the metal portion 100 or otherwise formed and attached to the metal portion 100, for example by ultrasonic welding, and optionally machined so that it has a generally cylindrical shape complementary to the metal portion 100. The polymer portion 200 has second engagement features 220 which are complementary to the first engagement features 120 of the metal portion 100. The second engagement features 220 are preferably formed by molding the polymer portion 200 onto the metal portion 100 having the first engagement features 120, although the second engagement features 220 can be pre-formed in the polymer portion 200 before attaching the polymer portion 200 to the metal portion 100.

The majority, if not all, of the polymer portion 200 is preferably attached to and covers the exterior surface area 148b of the nose 148 of the metal portion 100. Preferably the polymer portion 200 covers at least 60%, more preferably at least 70%, most preferably at least 80% of the exterior surface area 148b of the nose 148 to greatly reduce heat loss from the gudgeon 12. As shown, the polymer portion 200 covers 100% of the exterior surface area 148b of the nose 148, and the polymer portion 200 also covers the exterior surface area 128a of the shoulder 128 adjacent to the exterior surface area 148b of the nose 148. Referring to FIGS. 1 and 2, the preferred polymer portion consists of, in order away from the head 60: a base 210, a journal section 212, a ring section 214, and optionally one or more drive engagers 220. The base 210 of the polymer portion 200 can be directly attached, preferably mechanically, to the mid-section 138 of the metal portion 100. The journal section 212 of the polymer portion 200 is preferably directly attached, preferably mechanically, to the grooved section 150 of the metal portion 100. The attachment of the base 210 and the journal section 212 of the polymer portion 200 to the metal portion 100 is preferably provided by the mechanical attachment of the second engagement features 220 of the polymer portion 200 to the knurls 160 and the undercuts 170 and by the shrinkage of the polymer when molding the polymer portion 200 onto the metal portion 100. When the gudgeon 12 is in use in a roller 10, the knurls 160 in the metal portion 100 are particularly well-suited for transmitting the torque from the polymer portion 200 to the metal portion 100. When the gudgeon 12 is use in the roller 10, the undercuts 170 are particularly well-suited for preventing differential motion between the polymer portion 200 and the metal portion 100 along the axis A of the roller 10 (shown in FIG. 4). Alteratively or in addition to the mechanical attachment, chemical attachment between the polymer portion to the metal portion 100 can be used by the addition of a metal primer, adhesive, or the like between the metal portion 100 and the polymer portion 200.

The polymer portion 200 of the shaft 70 extends at least as far as, preferably further than, the metal portion 100 of the shaft 70 away from the head 60 of the gudgeon 12. In the presently preferred gudgeon, the part of the shaft 70 which fits into the bearing consists of polymer portion 200 and metal portion 100, although this invention covers a gudgeon for which the part of the shaft 70 which fits into the bearing consists of polymer portion 200 only. For the part of the shaft 70 which fits into the bearing, the metal portion 100 can be present from one end to the other of that part of the shaft or it can be present only at one end (and not the other end) for that part of the shaft 70.

The composite gudgeon 12, preferably has a cylindrical area 124. The cylindrical area 124 is preferably formed by the metal portion 100 and the polymer portion 200. The cylindrical area 124 in the gudgeon can optionally accept an internal heat shield (not shown). The heat shield can provide additional protection against the loss of heat through the gudgeon 12. The placement of a heat shield can be adjusted to minimize the heat transfer to the gudgeon 12 from the heated roller 10. If used the gap between the gudgeon and the heat shield preferably is between 0.025 to 0.064 mm (0.001 to 0.250 inches), more preferably about 0.017 mm (0.065 inches).

As shown in FIGS. 1 and 2, the ring section 214 preferably consists only of the polymer portion 200. The inside diameter of the ring section 214 is preferably the same as the inside diameter of the nose 148 adjacent to the ring section 214 and the inside diameter of the ring section 214 is generally constant. The ring section 214 preferably has a circumferential retaining clip groove 52 in the polymer portion 200. A retaining clip, (not shown) such as an 'E' ring, can be inserted into the circumferential retaining clip groove 52 as part of the mounting mechanism for the roller, for example, in an electrostatographic machine. In addition, the mounting mechanism 300 preferably includes a bearing 302 into which preferably the journal section 212 is inserted. It is preferred that the journal section 212 is constructed to expand at the operation temperatures of the roller to press-fit against the inner race of the bearing. Alternatively, other means of engaging the bearing by the journal section can be used, for example, the journal section can have a specific shape and the inner race of the bearing can have a complementary shape into which the journal fits.

The polymer portion 200 optionally has one or more drive engagers 216 which are shown as two lugs 218 in FIGS. 1, 2 and 4, which protrude preferably from the ring section 214. The drive engagers can be used to engage a drive source, typically a gear, which rotatively drives the gudgeon 12 and thereby rotatively drives the roller 10 to which the gudgeon 12 is attached. Drive engagers can take any form such as, intrusions or protrusions or combinations of the two having, for example, 'D' shapes, or parallel flats. The drive source, if present, is part of the mounting mechanism for a roller 10.

This invention contemplates that the configurations of the metal portion 100 and the polymer portion 200 can be altered by a person of ordinary skill in the art to fit a desired mounting mechanism. For example, the base 210 of the polymer portion 200 can be molded to include drive engagers, the ring-section 214 can be next to the base 210 and the journal section 212 can be next to the ring section 214 (furthest from the head 60 of the gudgeon 12).

The metal portion 100 and the polymer portion 200 of this gudgeon 12 are preferably attached so strongly that in order to remove one from the other, the metal portion 100 or the polymer portion 200 must be broken. It is an additional benefit of this invention that after the gudgeon 12 has been used on a roller 10, and the roller 10 is spent that the metal portion 100 of the gudgeon 12 can be recycled. The polymer portion 200 preferably can be mechanically broken and removed from the metal portion 100, and a new polymer portion 200 can be molded onto the metal portion 100 to form a new gudgeon 12. Reusing the metal portion 100 provides cost savings. The polymer portion is removeable from the metal portion, because preferably the first and second engagement features are subtantially the only means attaching the polymer portion to the metal portion. Preferably chemical bonding of the polymer portion to the metal portion is non-existant or insubstantial. In the currently preferred embodiment the polymer portion is stressed and relatively brittle at ambient temperature; therefore, removal of the polymer portion from the metal portion can generally be accomplished by one or a few light impacts with a hammer and a wedge or the like.

The metal portion of the gudgeon can comprise any known metals, or mixtures of metals. Examples of metals include steel, aluminum, copper, and zinc. Preferably the metal portion is monolithic. The preferred metal is austenitic stainless steel powder metal, because it exhibits relatively low thermal conductivity, and corrosion resistance; it can be molded to near net shape; and it has appropriate strength and stiffness characteristics. Austenitic stainless steel can be defined as stainless steel composed principally of iron, nickel and chromium. Examples of austenitic stainless steels include AISI (American Iron and Steel Institute) type 303, 304 and 316 stainless steels. To increase the machinability of the metal portion, 1–5% by weight of molybdenum disulfide may be added to the austenitic steel powder. The powder metal can also be impregnated with a sealer so that cutting fluids do not enter the metal portion and for improved machinability. The powder metal portion is preferably made by molding the powder metal, sintering the powder metal, and machining the sintered powder metal portion. Alternatively, the powder metal portion can be made by injection molding the powder metal, sintering the powder metal, and machining the sintered powder metal portion.

It was found that for maximum strength and minimum thermal conductivity, the stainless steel powder should have a particle size of less than minus 149 microns (minus one hundred mesh (−100 mesh)). A −149 microns (−100 mesh) to plus five micron range in particle size is also acceptable.

The stainless steel powder, for example, AISI type 316 SS powder, should be molded under a pressure of about 40 to 50 tons/square inch. The molding objective should be to achieve a green density of about 6.3 to 6.8 gm/cc, as well as to achieve as near an end shape as is possible so as to minimize post-molding machining. For such molding, a lubricant, for example, lithium stearate, acro wax or similar material may be added to the powder at the rate of 0.5 to 1.0% by weight. It should be noted that higher pressures for molding, as much as 60 tons psi, may also be used if greater strength in the resulting gudgeon is required. However, increasing the molding pressure ordinarily will increase the thermal conductivity of the resulting gudgeon. The molded gudgeon thereafter should be sintered at a temperature of 1121° C. to 1371° C. (2050° to 2500° F.) preferably 1135° to 1246° C. (2100° to 2300° F.) in a furnace having a reducing atmosphere, such as $H_2$. Sintering in this range of temperature assures sufficient toughness and ductility of the resulting gudgeon. Lower sintering temperatures can also be used if high toughness is not critical for the end use of the gudgeon.

The interconnected porosity of each metal can be determined or tested by means of Standard Test No. ANSI/ASTM B328, which is a test for determining density and interconnected porosity of sintered powder metal structural parts. It was found that the thermal conductivity of such parts increased with increasing sintered density, but with decreasing interconnected porosity. Additionally, it was found that the strength and ductility of the resulting parts varied directly with the density and inversely with the interconnected and isolated porosities. Optimum values for the sintered density are 6.4 to 6.9 g/cc, and a thermal conductivity between about 10 and 12 Watts/m-° C. at 205° C. (6 and 7 Btu/hr-ft-° F. at 400° F.).

After sintering the metal portion of the gudgeon, the metal portion is machined to add one or more undercuts by the process of lathe machining or the like. To improve the roachinability of the sintered metal part it is preferred to seal the metal surface by vacuum impregnating the powder metal part with an adhesive material, for example Loctite™ anaerobic adhesive. An additional benefit of impregnation is that machining fluids are not absorbed by the powder metal part, which eliminates the possible incompatibility of the machining fluids with the polymer portion if the polymer portion is injection molded onto the metal portion. After machining it, the metal portion is then ready for the attachment of the polymer portion to the metal portion.

The polymer portion can comprise any polymer or mixture of polymers that can maintain its structural integrity when operating in contact with high temperature parts under high pressures. Examples of suitable polymers include thermosetting resins such as polyimides, phenolics, vinyl esters, and polyesters and thermoplastic materials such as thermoplastic polyimides, poly(amide-imides), poly(ether-imides), polyphthalamides, polyphenylene sulfides and polyketones. The polymer of the polymer portion when molded onto the metal portion preferably has higher tensile stresses at ambient temperature than at the operating temperatures; therefore, a polymer having high tensile strength for example, greater than $17.2 \times 10^8$ kg/m$^2$ is best suited for the polymer portion. Examples of commercially available materials that are useful in this invention include HT750™ from Fiberite, Aurum™ from Mitusi Co.; Torlon™, Amodel™, and Kadel™ from Amoco; Ultem™ from GE; Ryton™ from Phillips; and Victrex™ from ICI. The presently preferred polymers are a polyphthalamide, particularly, Amodel™ from Amoco and a phenolic, particularly, HT750™ from Fiberite.

The polymer portion can be made and later mechanically attached to the metal portion; however, the preferred method of making and attaching the polymer portion to the metal portion of the gudgeon is to injection mold liquid polymer into a mold containing the metal portion so that the polymer portion is formed and attached to the metal portion simultaneously. The polymer portion is preferably monolithic. Preferably the polymer is injected at an elevated temperature and the metal portion is at a much lower temperature, when the polymer cools to room temperature, the polymer is mechanically attached similar to a shrink fit. The mold (not shown) of the polymer portion can be made to form a seal with the shoulder 128 and ridge 130 of the metal portion 100.

After the polymer cools and solidifies, which typically takes from 5 to 60 seconds, the gudgeon is removed from the mold. Preferably, the polymer portion is machined to shape the journal section 212, and the circumferential retaining clip groove 52.

One method of making the composite gudgeon is as follows. A single cavity injection mold into which the metal portion of the gudgeon can be inserted was fabricated by conventional mold-making processes to the shape of the composite gudgeon as shown in the figures. The metal portion was inserted into the mold. A 150 ton Van Dorn injection-molding machine equipped with hot oil heating capability for the mold was used to inject the liquid into the mold. For example, a polymer portion consisting of Amodel™ from Amoco was made as follows. The polymer material was dried in a forced draft oven at (205° C.) 400° F. for 4 hours. The temperatures of the molding machine were set. The rear zone temperature was 305° C. (580° F.), the center zone temperature was 310° C. (590° F.), the front zone temperature was 321° C. (600° F.), and the nozzle temperature was 321° C. (610° F.). The mold was preheated to 135° C. (275° F.). The metal portion was inserted into the mold and allowed to heat up for a couple of seconds. The metal insert can also be preheated in a seperate oven prior to inserting it into the mold. The mold was sprayed with a silicone release agent. The polymer was then injected into the mold around the metal portion. The boost pressure was set at $4.13 \times 10^7$ kg/m$^2$ (600 psi), the hold pressure was set at $2.76 \times 10^7$ kg/m$^2$ (400 psi), the back pressure was (50 psi) $3.44 \times 10^6$ kg/m$^2$. The boost time was 1.5 seconds, the hold time was 5.0 seconds. The rate of injection of the polymer was slow enough to not cause flashing of the part, but fast enough to completely fill the mold. The molded composite gudgeon was allowed to solidify for 15.0 seconds before manually ejecting it from the mold.

The method of molding should be optimized to minimize tensile stress in the polymer portion of the part due to shrinkage of the polymer from injection temperature to room temperature. Preheating the mold and metal insert helps to minimize the stresses. The metal portion is preferably preheated to the injection temperature of the polymer. Further, adjusting where the polymer portion is injected into the mold can reduce the stresses. It was found in some cases that injecting the polymer furthest from the metal insert improved the results. In addition, the results were improved when the polymer portion produced by the mold had generally uniform thicknesses of the polymer material.

Figure 5:
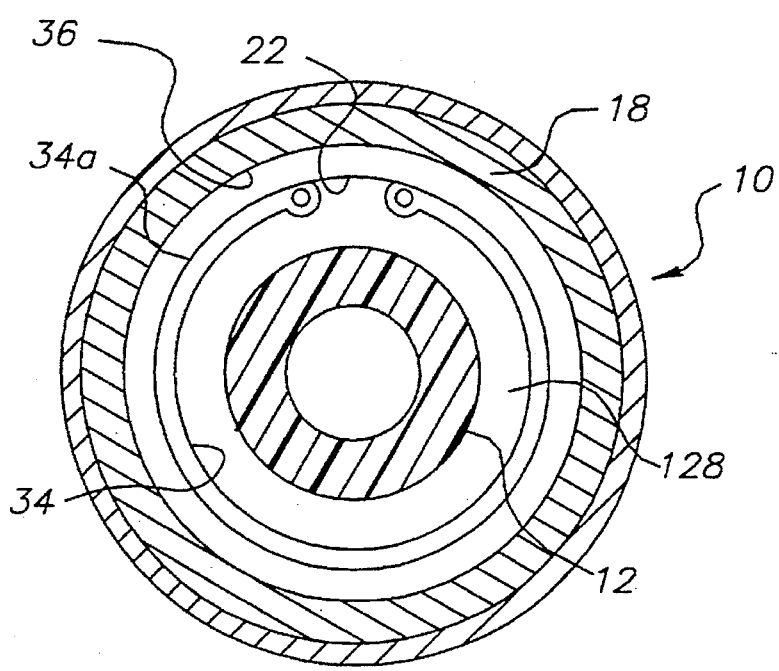
FIG. 5 is an end view, in cross-section of the assembly of FIG. 4 taken substantially along the lines 5—5 of FIG. 4.

In use, the gudgeon is attached to a heated roller, typically to the core of the roller to form a roller assembly. The gudgeon can be attached through welding, press-fitting or mechanical attachments or the metal portion of the gudgeon may be machined from the same piece of metal as the core as one continuous piece. In the latter case, the metal core ends and the metal portion of the gudgeon begins where the inside or outside diameter of the metal core changes, but if the diameters remain constant, the gudgeon begins where the metal contacts the polymer portion. The method of friction welding the gudgeon to the core is described by Dolcimascolo in U.S. Pat. No. 5,094,613, incorporated herein by reference. The preferred method of attaching the gudgeon to the core is through one or more coupling elements which provide for the removability of the gudgeon from the roller. Examples of such coupling elements include clamps, screws, rings, springs or the like. The most preferred coupling elements are a key and an open ring as shown in FIGS. 4 and 5, and also described in U.S. Pat. No. 4,229,950, incorporated herein by reference. Coupling elements which provide for the removability of the gudgeon from the roller make it easy to recycle the metal portion of the gudgeon.

FIGS. 4 and 5 shows a roller assembly of this invention comprising a composite gudgeon 12 attached to a heated roller 10. This roller is internally heated by a lamp 16; however, any heat source for the roller, including other internal or external heat source; such as, a heating coil, a lamp or contact heat source, such as, another heated roller, is useful in this invention. For ease of illustration only one end of the roller 10 and its respective gudgeon 12 are shown, the opposite end being of identical (but mirrored) construction. As shown, it is preferred that at least one of the gudgeons 12 is rotatively driven by a drive source (not shown), through one or more drive engagers 216, i.e. lugs 218 about longitudinal axis A of the roller 10. The drive source can be a gear, or a coupling device or other power source. Alternatively, the roller can be driven not through the gudgeon, but by contact with another rotating roller, for example. The opposite gudgeon can be constructed without lugs 218. The roller 10 has an internal heat source, such as a lamp 16 and includes a cylindrical core 18 of heat conducting material, such as aluminum or steel. The thermal conductivity of the core 18 enables the roller to be used in applications where heat transmission through the peripheral surface of the roller is desired. When the roller 10 is to be used, for example, as a fuser roller for fixing toned images in a printer or electrophotographic copier, the core 18 may be covered with a heat conducting compliant sleeve 20, such as carbon filled silicone rubber providing a desirable offset preventing surface. The end of the core 18 includes a concentric bore 22 having an interior end wall 22a which forms a seat for the gudgeon 12.

The drive interconnection between the gudgeon 12 and the roller 10 may be provided by a key way 30 in the shoulder 128 of the gudgeon, and a key way 40 in the core 18 into which a key 32, which is an independent member, is inserted, so that when the gudgeon 12 is rotatively driven, the roller 10 is rotatively driven about its longitudinal axis. Alternatively, the key may be integral with the core 18 and extending into the key way 30 in the shoulder 128 of the gudgeon, or the key may be integral with the gudgeon and extending into the key way 40 in the core 18. A coupling element is provided to constantly urge the gudgeon 12 into engagement with interior end wall 22a of the bore 22. The coupling element is a substantially cylindrical open ring 34 (e.g. a Tru Arc™ ring) formed of radially resilient material so that the diameter of the ring may increase or decrease. The ring 34 is received in an annular groove 36 formed in the internal peripheral surface of the core 18 between the interior end wall 22a and the end of the roller 10. The groove 36 has a first side wall 36a and a second side wall 36b spaced from and angularly disposed to the first side wall. The diameter of the ring 34 is selected so that in its free state, it is at least larger, preferably much larger, than the minimum diameter of the groove 36. A peripheral edge 34a of the ring is beveled so as to be substantially complimentary to the second side wall 36b of the groove.

Upon assembly, the gudgeon 12 is seated on the end wall 22a of the concentric bore 22 with the key 32 received in the key ways 30, 40. The ring 34 is then compressed and inserted into the groove 36 adjacent to the wall 36b. If the key 32 is an independent member, it is inserted into the key way 40 in the core 18 before placing the shoulder 128 of the gudgeon 12 against the end wall 22a. The opening of the ring 34 is positioned away from the key way 30 to hold the key 32 in the key way 30. Because the ring is radially resilient, it expands in the groove 36 until the beveled edge 34a engages the tapered side wall 36b. The location of the groove 36 between the end wall 22a and the end of the roller is particularly selected so that as the beveled edge 34a of the ring 34 wedges against the tapered side wall 36b the lateral surface 34b of the ring engages the ridge 130 of the gudgeon and urges the gudgeon into positive engagement with the end wall 22a. The width of the groove is such that over the entire operative temperature range (and all thermal expansion or contraction of the core 18 and gudgeon 12) the ring 34 remains wedged in engagement between the ridge 130 and the side wall 36b. Thus, the expansion force of the compressed ring exerted on the side wall 36b has a reaction component parallel to the axis A which causes the ring 34 to constantly urge the shoulder 128 of the gudgeon into engagement with the end wall 22a over the entire operative temperature range. The gudgeon is thus captured in the roller 10; and further, the friction forces between the engaging surfaces increase the effectiveness of the drive interconnection.

The invention has been described in detail with particular reference to a preferred embodiment thereof, but it will be understood that variations and modifications can be effected within the spirit and scope of the invention.

|  | Parts List |
| --- | --- |
| 10 | roller |
| 12 | gudgeon |
| 16 | lamp |
| 18 | core |
| 20 | sleeve |

Parts List

| | |
|---|---|
| 22 | concentric bore |
| 22a | interior end wall of the bore |
| 30 | key way in gudgeon |
| 32 | key |
| 34 | ring |
| 34a | edge of ring |
| 34b | lateral surface of ring |
| 36 | groove |
| 36a | first side wall of groove |
| 36b | second side wall of groove |
| 40 | key way in core |
| 52 | circumferential retaining clip groove |
| 60 | head |
| 70 | shaft |
| 100 | metal portion |
| 120 | first engagement features |
| 124 | cylindrical area |
| 128 | shoulder |
| 128a | exterior surface of the shoulder |
| 130 | ridge |
| 138 | mid-section |
| 148 | nose |
| 148a | interior surface area of the nose |
| 148b | exterior surface area of the nose |
| 150 | grooved section |
| 160 | knurls |
| 170 | undercuts |
| 200 | polymer portion |
| 210 | base |
| 212 | journal section |
| 214 | ring section |
| 216 | drive engager |
| 218 | lugs |
| 220 | second engagement features |
| 300 | mounting mechanism |
| 302 | bearing |
| A | axis |
| 5-5 | line |

We claim:

1. A gudgeon for a heated roller having a mounting mechanism, said gudgeon comprises a metal portion and a polymer portion; said metal portion comprises a shoulder, a nose and first engagement features; said polymer portion comprises second engagement features, said first and second engagement features are complementary and attach said polymer portion to said metal portion at ambient temperature, and wherein when said gudgeon is in use said metal portion contacts said roller, and said polymer portion contacts said mounting mechanism for said roller; said nose having an interior surface area, and an exterior surface area; said polymer portion covering at least 60 percent of said exterior surface area of said nose.

2. The gudgeon of claim 1, wherein said polymer portion covers at least 70 percent of said exterior surface area of said nose.

3. The gudgeon of claim 1, wherein the polymer portion comprises a polymer selected from the group consisting of polyimides, phenolics, vinyl esters, polyesters, poly(amide-imides), poly(ether-imides), polyphthalamides, polyphenylene sulfides and polyketones.

4. The gudgeon of claim 1, wherein the metal portion comprises a metal selected from the group consisting of steel, aluminum, copper, and zinc.

5. The gudgeon of claim 1, wherein the metal portion comprises austenitic stainless steel powder metal.

6. The gudgeon of claim 1, wherein said first engagement features comprise knurls.

7. The gudgeon of claim 1, wherein said metal portion comprises a key way.

8. A gudgeon for a heated roller having a mounting mechanism, said gudgeon comprises a metal portion and a polymer portion; said metal portion comprises first engagement features; said polymer portion comprises second engagement features, said first and second engagement features are complementary and attach said polymer portion to said metal portion at ambient temperature, and wherein when said gudgeon is in use said metal portion contacts said roller, and said polymer portion contacts said mounting mechanism for said roller; said polymer portion is 20 to 80 percent of the total volume of said gudgeon, and said metal portion is the remainder of the total volume of said gudgeon.

9. The gudgeon of claim 8, wherein said polymer portion is between 30 and 70 percent of the total volume of said gudgeon.

10. The gudgeon of claim 8, wherein said polymer portion is between 40 and 60 percent of the total volume of said gudgeon.

11. The gudgeon of claim 8, wherein said polymer portion comprises polyphthalamide or phenolic and said metal portion comprises austenitic stainless steel.

12. The gudgeon of claim 8, wherein said polymer portion is molded onto said metal portion.

13. The gudgeon of claim 8, wherein said polymer portion comprises polymer, said polymer portion being molded onto said metal portion by injection-molding said polymer into a mold into which the metal portion was inserted.

14. The gudgeon of claim 8, wherein said polymer portion comprises polymer, said polymer having higher internal tensile stress at ambient temperature than at the temperatures it is heated to when in use.

15. The gudgeon of claim 8, wherein said polymer portion and said metal portion can only be removed from each other if at least one of said polymer portion and said metal portion is broken.

16. A gudgeon for a heated roller having a mounting mechanism, said gudgeon comprises a head and a shaft; said shaft comprises a metal portion and a polymer portion; said metal portion of said shaft comprises first engagement features; said polymer portion of said shaft comprises second engagement features, said first and second engagement features are complementary and attach said polymer portion to said metal portion at ambient temperature, and wherein when said gudgeon is in use said metal portion contacts said roller, and said polymer portion contacts said mounting mechanism for said roller; said polymer portion of said shaft extends at least as far as said metal portion away from said head.

17. The gudgeon of claim 16, wherein said polymer portion comprises at least one drive engager.

18. The gudgeon of claim 16, wherein, said polymer portion transmits torque to said metal portion.

19. The gudgeon of claim 16, wherein said polymer portion of said shaft comprises a journal section for fitting into a bearing.

20. A heated roller assembly comprising:

a core;

a heat source;

a mounting mechanism for said roller;

the gudgeon of claim 1; and a coupling element which attaches said gudgeon to said roller and which provides for the removeability of said gudgeon from said roller.

21. The heated roller assembly of claim 20, wherein said coupling element comprises an open ring.

* * * * *